United States Patent [19]
Conner et al.

[11] Patent Number: 5,953,153
[45] Date of Patent: Sep. 14, 1999

[54] SPATIAL LIGHT MODULATOR WITH IMPROVED LIGHT SHIELD

[75] Inventors: James L. Conner, Rowlett; Michael J. Overlaur, Plano; Jeffrey W. Clark, Garland; Herman A. Groller, Mesquite, all of Tex.

[73] Assignee: Texas Instruments Incorporated, Dallas, Tex.

[21] Appl. No.: 08/958,018

[22] Filed: Oct. 27, 1997

Related U.S. Application Data

[60] Provisional application No. 60/029,505, Oct. 29, 1996.

[51] Int. Cl.⁶ .................................................. G02B 26/08
[52] U.S. Cl. ........................ 359/298; 359/223; 359/290; 359/291; 359/295
[58] Field of Search ................................. 359/290, 291, 359/295, 318, 855, 223, 224

[56] References Cited

U.S. PATENT DOCUMENTS

| | | | |
|---|---|---|---|
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,278,652 | 1/1994 | Urbanus et al. | 358/160 |
| 5,597,736 | 1/1997 | Sampsell | 437/2 |
| 5,719,695 | 2/1998 | Heimbuch | 359/291 |
| 5,818,095 | 10/1998 | Sampsell | 257/435 |

*Primary Examiner*—Georgia Epps
*Assistant Examiner*—Margaret Burke
*Attorney, Agent, or Firm*—Charles A. Brill; Frederick J. Telecky, Jr.; Richard L. Donaldson

[57] ABSTRACT

A spatial light modulator (10) having a micromechanical active portion (12) encompassed by a light shield (14). The light shield (14) is fabricated upon a substrate (36) and has a plurality of openings (72, and 80) to permit underlying layers of photoresist (90, 92) to be undercut from beneath the light shield. Removal of the photoresist layers provides a sufficiently flat light shield, and eliminates the possibility that particles from the photoresist layer could migrate to beneath active micromirrors (30) of the spatial light modulator (12).

15 Claims, 4 Drawing Sheets

SPATIAL LIGHT MODULATOR WITH IMPROVED LIGHT SHIELD

This application claims the benefit of U.S. Provisional application No. 60/029,505 filed Oct. 29, 1996.

TECHNICAL FIELD OF THE INVENTION

The present invention is generally related to spatial light modulators for modulating incident light to form an optical light image, and more particularly, to a spatial light modulator having an improved light shield that encompasses the active portion of the micromechanical spatial light modulator.

BACKGROUND OF THE INVENTION

Spatial Light Modulators (SLMs) have found numerous applications in the areas of optical information processing, projection displays, video and graphics monitors, televisions, and electrophotographic printing. SLMs are devices that modulate incident light in a spatial pattern to form a light image corresponding to an electrical or optical input. The incident light may be modulated in its phase, intensity, polarization, or direction. The light modulation may be achieved by a variety of materials exhibiting various electro-optic or magneto-optic effects, and by materials that modulate light by surface deformation.

An SLM is typically comprised of an area or linear array of addressable picture elements (pixels). Source pixel data is first formatted by an associated control circuit, usually external to the SLM, and then loaded into the pixel array one frame at a time. This pixel data may be written to the pixel array using a variety of algorithms, i.e. sequentially top-to-bottom one pixel line at a time, interleaving by sequentially addressing top-to-bottom every other pixel line, such as the odd rows of pixels, and then returning to address the even pixel lines, etc. In cathode ray tubes (CRTs), this data writing technique is know as rasterizing, whereby a high powered electron gun scans across the pixel elements of a phosphor screen left to right, one line at a time. This pixel address data writing scheme is equally applicable to liquid crystal displays (LCDs) as well.

A recent innovation of Texas Instruments Incorporated of Dallas Texas, is the digital micromirror device or the deformable mirror device (collectively DMD). The DMD is an electro/mechanical/optical SLM suitable for use in displays, projectors and hard copy printers. The DMD is a monolithic single-chip integrated circuit SLM, comprised of a high density array of 16 micron square movable micromirrors on 17 micron centers. These mirrors are fabricated over address circuitry including an array of SRAM cells and address electrodes. Each mirror forms one pixel of the DMD array and is bistable, that is to say, stable in one of two positions, wherein a source of light directed upon the mirror array will be reflected in one of two directions. In one stable "on" mirror position, incident light to that mirror will be reflected to a projector lens and focused on a display screen or a photosensitive element of a printer. In the other "off" mirror position, light directed on the mirror will be deflected to a light absorber. Each mirror of the array is individually controlled to either direct incident light into the projector lens, or to the light absorber. The projector lens ultimately focuses and magnifies the modulated light from the pixel mirrors onto a display screen and produce an image in the case of a display. If each pixel mirror of the DMD array is in the "on" position, the displayed image will be an array of bright pixels.

For a more detailed discussion of the DMD device and uses, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse-width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

Conventionally, a light shield encompasses the active portion of the micromechanical spatial light modulator i.e. the tiny deflectable micromirrors. This light shield reflects incident light that overfills the SLM surface away from projection optics, and without defracting light which could reduce the display contrast ratio. It is necessary to overfill the SLM with light to achieve a uniform intensity across the active portion of the SLM. This light shield may have a reflective upper surface and be fabricated coplanar with the reflective mirrors of the DMD array. Typically, during fabrication, when the photoresist layers are undercut by a plasma etch process from beneath the movable micromechanical pixel mirrors, the photoresist layer remains underneath the light shield. It is necessary that the light shield remain mechanically supported to maintain a flat surface. However, the photoresist material, which is UV-cured, does not always facilitate a uniformly flat shield surface, and thus the shield can deflect incident light back into the projection optics which consequently degrades the contrast ratio of the displayed image. In addition, the photoresist material remaining under the light shield can subsequently generate particles which may migrate to the active areas of the DMD array, and inhibit the operation of the deflectable micromirrors.

It is desired to provide a reinforced light shield without maintaining any photoresist beneath the light shield.

SUMMARY OF THE INVENTION

The present invention achieves technical advantages as a spatial light modulator having an improved light shield being structurally supported, whereby the photoresist is undercut from beneath the light shield. The light shield is fabricated with mirrors substantially identical to the active micromirrors of the SLM, but wherein the light shield mirrors are inoperative and structurally secured to maintain a sufficiently flat shield without the need for a photoresist support layer.

The present invention comprises a device including a spatial light modulator having an array of light reflecting members fabricated upon a substrate. A light shield is positioned over the substrate and closely adjacent, and preferably encompassing, the light reflecting members. The light shield comprises a light reflecting surface having a plurality of openings defined therethrough to permit photoresist material positioned thereunder during manufacturing to be undercut from beneath the shield. The light shield comprising an array of micromirrors rendered inoperative, and tied together to form a flat surface with openings. This permits the light shield to be formed simultaneously with the superstructure of the micromirrors forming the spatial light modulator. That is, the support structure for the light shield is substantially similar to the support structure for the micromirrors.

The support structure for the light shield includes a continuous planar member extending over the substrate and also having a plurality of openings defined therethrough to permit any photoresist material positioned between this continuous planar member and the substrate to be undercut as well. This planar shield support member is coplanar with the yoke layer for the operative micromirrors. Portions of the light shield are electrically connected to the adjacent active light reflecting members of the spatial light modulator, and thus are at the same electrical potential thereof to avoid any differential between the shield members and the closely adjacent active micromirrors. The shield is preferably comprised of a series of light reflecting members that are rectangular and connected to adjacent members at their corners, thus defining openings between these corners to facilitate the etching of photoresist material therebelow. These openings are further defined to be elongated and parallel to the edges of the micromirrors so as to minimize the diffraction of incident light along these opening edges into the projection optics.

DETAILED DESCRIPTION OF THE PREFERRED EMBODIMENT

Figure 1:
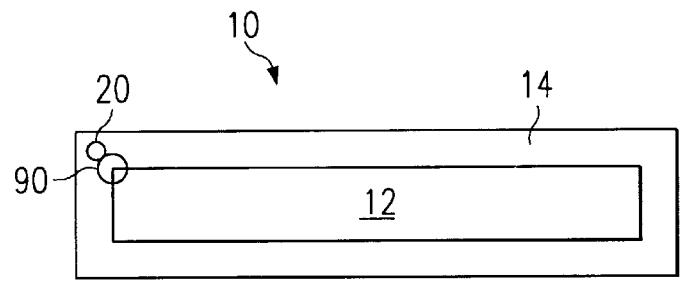
FIG. 1 is a top view of an elongated micromechanical spatial light modulator including a light shield extending about the active portion of the device.
Figure 2:
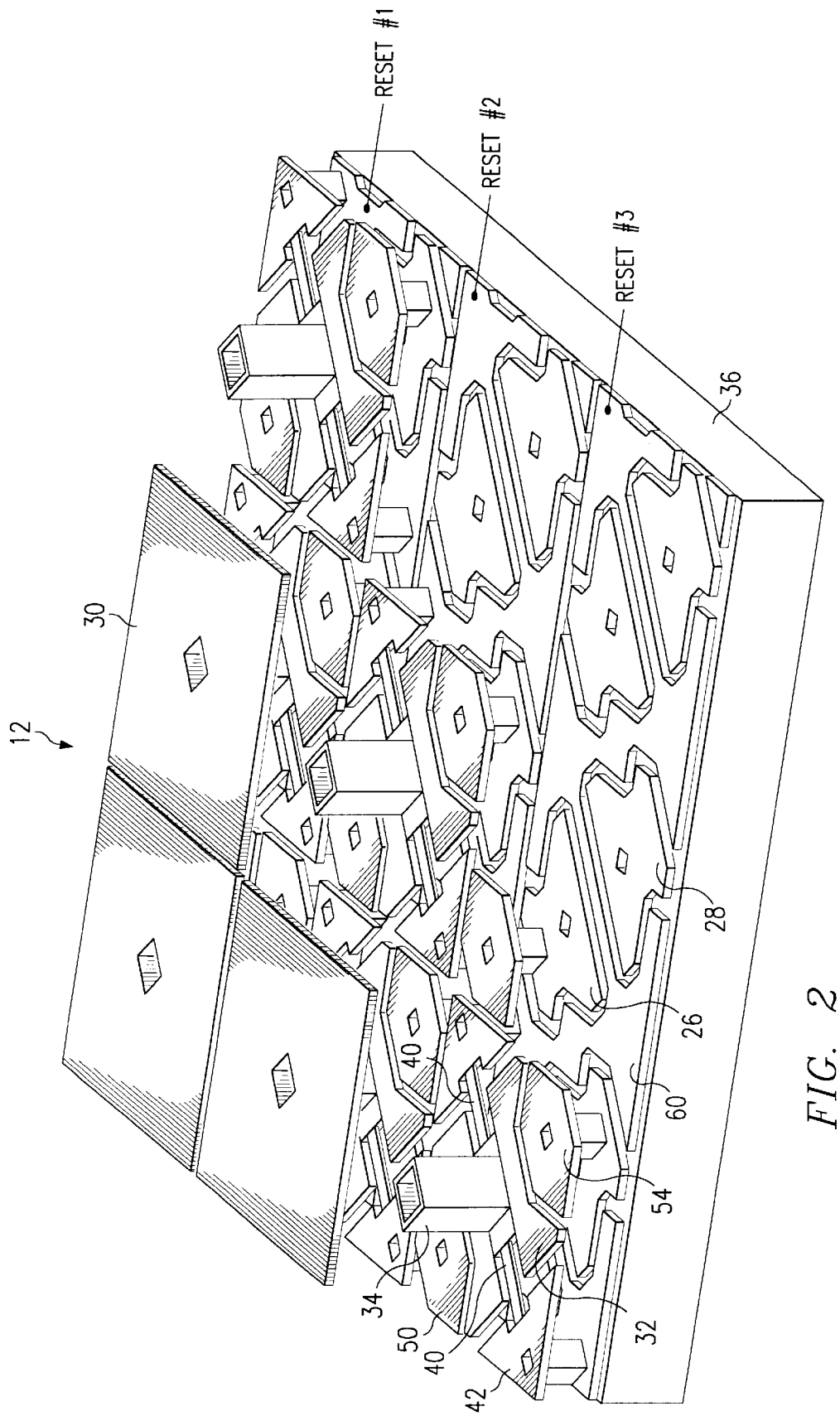
FIG. 2 is a sectioned view of a 3×3 array of pixels of the active portion of the device shown in FIG. 1, illustrating the yokes supporting mirrors, elevated address electrodes, and hinge support posts defined upon a substrate level having address electrodes and bias/reset patterns.

Referring now to FIG. 1, there is shown generally at 10 a spatial light modulator having an active portion 12 and a light shield 14 positioned closely adjacent and encompassing the active portion 12. Both the active portion 12 and the light shield 14 have a light reflecting upper surface. Referring to FIG. 2, there is shown a 3×3 array of micromechanical pixels forming a small portion of the spatial light modulator 12. The area array of pixels varies from device to device, and may be, for example, 64×7048 for a hardcopy SLM and 1,280×2,048 for an HDTV display. For a detailed discussion of the active portion 12 of device 10, cross reference is made to commonly assigned U.S. Pat. No. 5,535,047, entitled "Active Yoke Hidden Hinge Digital Micromirror Device", the teachings of which are incorporated herein by reference.

Still referring to FIG. 2, the active portion 12 essentially comprises an area array of 16 micron square micromirrors 30 fabricated over support structure, each mirror 30 being deflectable plus/minus 10° upon hinges extending between support posts, as briefly discussed in the section entitled Background of the Invention. The support structure for each mirror includes hinges 40, hinge support posts 42, yoke 32, elevated address electrodes 50 and 54, and mirror support post 34. Address electrodes 26 and 28 are fabricated upon the substrate 36, with four (4) bias/reset buses 60 (three being shown) formed coplanar with address electrodes 26 and 28. The method for fabricating this structure is also detailed in the cross referenced commonly assigned '047 patent, the teachings of which are incorporated-herein by reference.

Referring back to FIG. 1, the light shield 14 encompassing the active portion 12 of the spatial light modulator 10 will now be discussed further. A small portion 20 of the light shield 14, shown at the corner of the device 10, is enlarged and shown in FIG. 3. While a 3×3 array is shown, the shield width is about 60 mirrors wide.

Figure 3:
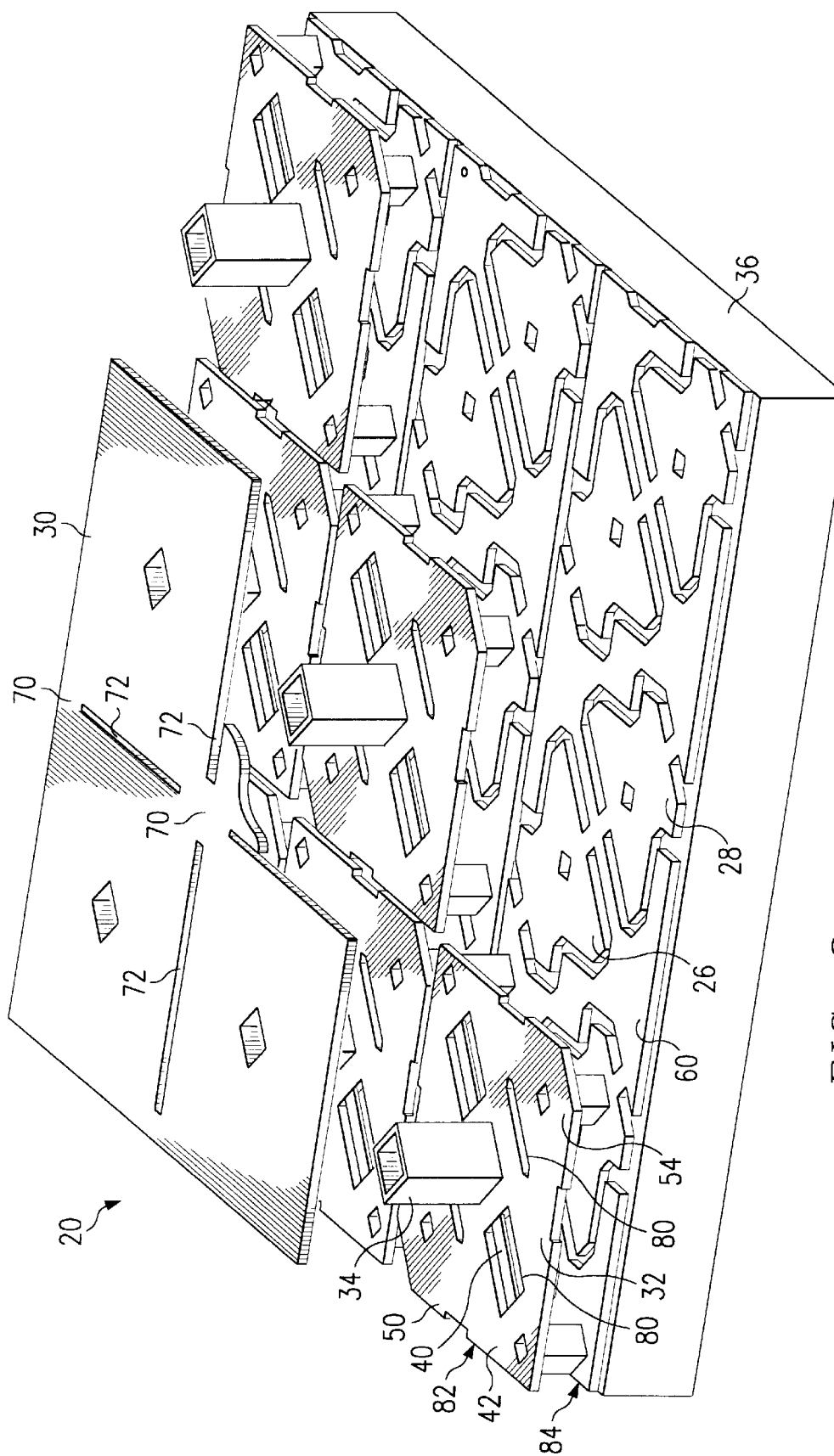
FIG. 3 is a sectioned view of a portion of the light shield encompassing the active portion of the device in FIG. 1, illustrating the light shield being formed of micromirrors tied together at their corners, and fabricated upon a support structure with photoresist material having been undercut from between the mirrors and the support structure, and from between the support structure and the substrate.

Referring to FIG. 3, light shield 14 is seen to comprise of an array of micromirrors 30, as shown in FIG. 2, but whereby the corners of these mirrors are structurally tied together, as shown at 70. By tieing the corners of the mirrors together, these mirrors are rendered inoperable and thus cannot pivot, and together provide a reflective flat surface. Moreover, by tieing the corners of the mirrors 30 together, there is defined a series of elongated openings 72 between the adjacent mirrors 30 which permits photoresist to be undercut from the light shield during manufacturing. It is noted that these elongated openings 72 are very narrow, having a spacing of one micron and extending parallel to the edges of the mirrors, thus minimizing diffraction of incident light from these edges into the projection optics (not shown).

The underlying support structure, shown at 82, also is structurally tied together and thus is rendered mechanically inoperative so as to provide a rigid support for the supported tied mirrors 30, as shown. With reference to FIG. 2, it can be seen in FIG. 3 that the various support structure for the shield 14 is mechanically tied together. That is, at the intermediate support level 82, the yoke 32, the support posts 42, and the elevated address electrodes 50 and 54 are all tied together and essentially form a coplanar surface with a plurality of opening 80 defined through structure 82. Openings 80 function similar to openings 72 in that they permit the photoresist spacer under layer 82 used during manufacturing to be undercut therefrom using a plasma etch process.

Figure 4:
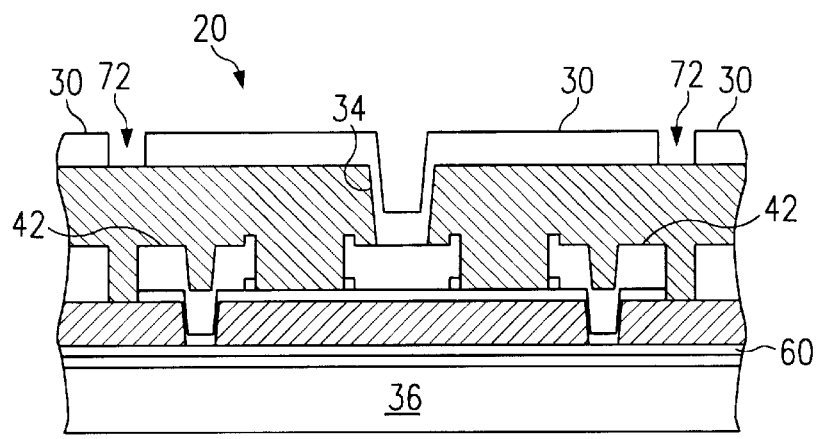
FIG. 4 is a cross sectional view of one portion of the light shield with the photoresist layers still in place during the manufacturing step.
Figure 5:
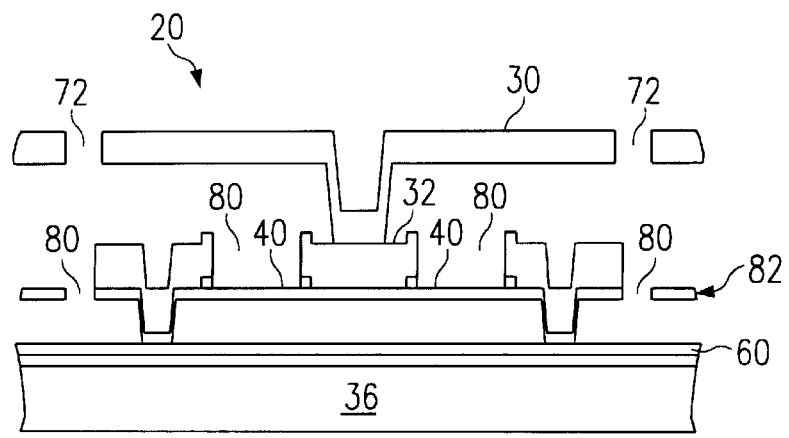
FIG. 5 is a sectional view of the shield portion in FIG. 4 illustrating the photoresist support layers having been undercut by a plasma etch process from beneath the light shield.

Referring to FIG. 4, there is shown one mirror 30 comprising a portion of the light shield 14 before the underlying photoresist layers 90 and 92 are removed. Referring to FIG. 5, there is shown the same portion of the completed light shield structure 14 with the photoresist layers 90 and 92 having been removed by a conventional plasma etch process. The openings 72 defined through the light reflective surface, as well as the openings 80 defined through the support surface 82, as shown in FIG. 3, facilitate the undercutting of these photoresist layers from beneath the light shield 14. The remaining light shield structure 14 is rigidly enforced by the intermediate support layer 82, and by the interconnected mirrors 30.

Figure 6:
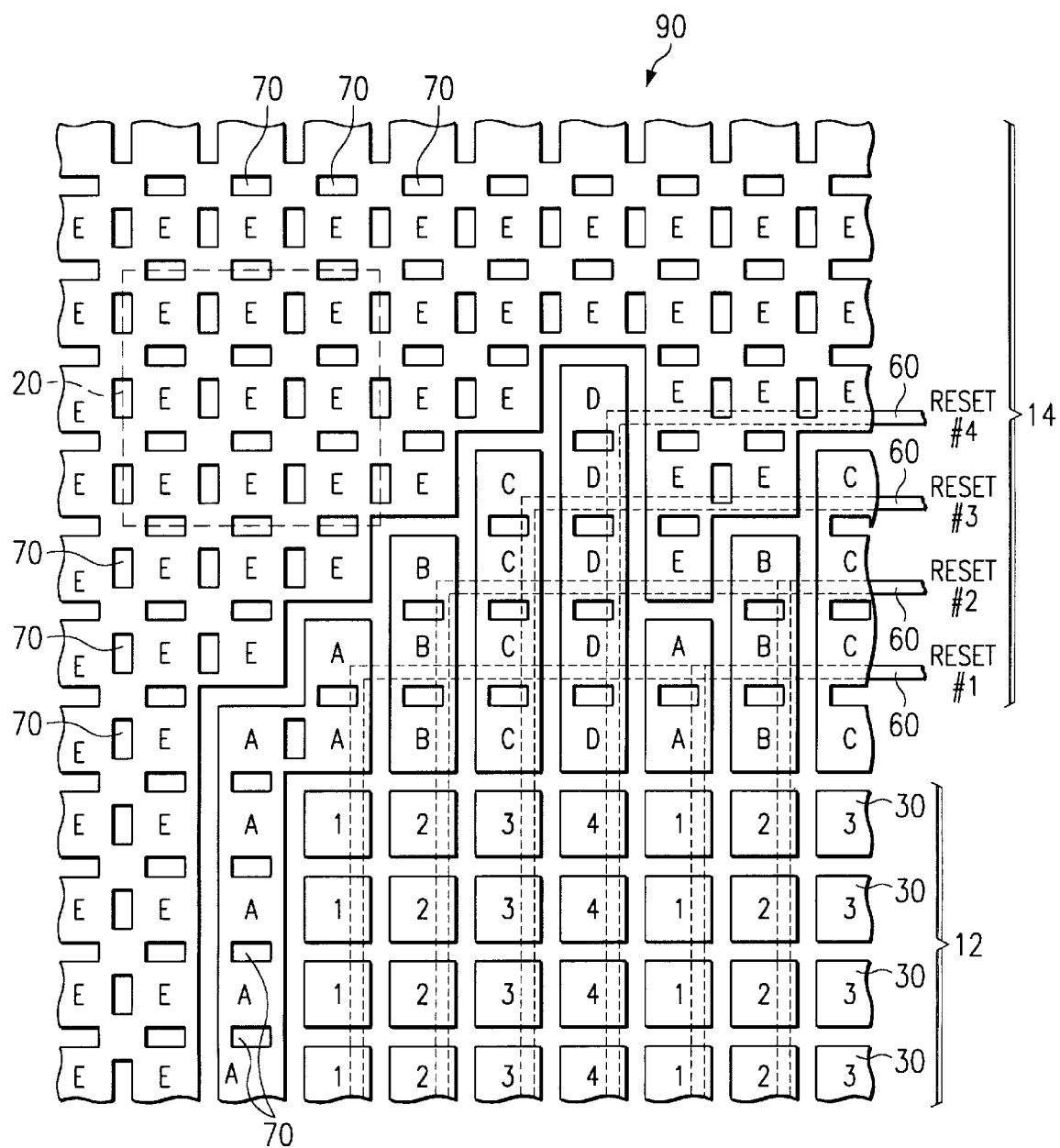
FIG. 6 is a top view of the shield and active portion illustrating the non-active shield members being at the same electrical potential as the adjacent active mirrors.

Now referring now to FIG. 6, in reference to FIG. 1, there is generally shown at 90 a portion of the light shield 14 that is formed about the corner of the active portion 12 comprising the movable micromirrors. FIG. 6 illustrates how particular non-functional mirrors 30 forming the shield 14 are mechanically and electrically tied together about the active portion 12. One feature of the present invention is that the perimeter inactive shield members 30 are biased to have the same electrical potential as the adjacent active mirror 30. It is desirable to maintain a zero voltage differential between the light shield 14 and the active deflectable members 30 to help ensure there will be no interactive effect between the shield 14 and the adjacent active mirrors 30.

Still referring to FIG. 6, it can be seen that the active portion 12 of the spatial light modulator 10 is functionally arranged as micromirrors 30 in interlaced columns 1, 2, 3 and 4, as shown. Micromirrors 30 in column 1 are electrically tied to reset bus #1, micromirrors 30 in column 2 connected are electrically to reset bus #2, micromirrors 30 in column 3 are electrically connected to reset bus #3, and micromirrors 30 in column 4 are electric ally connected to reset bus #4. Referring back to FIG. 2, it can be seen that the reset buses are formed by the bias/reset layer 60 patterned beneath the respective pixels 30. When particular columns of pixels 30 are reset, a voltage such as +30 volts is applied to the corresponding reset bus for the respective columns of pixels. This initiates a deflection of the mirrors 30 to their desired state, depending on the address in the underlying memory cells resulting in a voltage being applied to address electrodes 26 and 28. A +5 volt potential is normally applied to the reset buses, this voltage thus being provided to the overlying pixel mirrors 30, when the pixel members 30 are set.

Referring back to FIG. 6, it can be seen that particular non-active shield mirrors, identified at "A", are mechanically tied to each other at their tips, and are also electrically tied to the reset bus #1. Thus, the shield members identified at "A" are at the same electrical potential as the adjacent column of active mirrors identified as "1". Likewise, the non-active shield members identified at "B" are mechanically and electrically tied together, and are also electrically tied to the respective reset bus #2. Thus, the members "B" are at the same electrical potential as the adjacent active mirror 30 identified in column "2". Likewise, the non-active shield members "C" are electrically and mechanically tied together at their tips, and are also electrically tied to the underlying reset bus #3 and the mirrors in adjacent column 3. The non-active shield members "D" are mechanically and electrically tied together, and electrically tied to underlying reset bus #4 and the adjacent pixel members 30 identified in column "4". Therefore, whenever a +30 volt potential is applied to, for instance, reset bus #1, all of active mirrors "1" are at the same electrical potential as the adjacent non-active members "A". This ensures there is no potential between the active mirrors 30 and the adjacent non-active mirrors forming a portion of the shield 14.

As a note, in the embodiment shown in FIG. 6, the active members 30 comprising the active array 12 are functionally partitioned in four columns such that one-fourth of the members are reset at any one time. If the active mirrors 30 were all reset at once, then just one common reset bus would be provided. All of the non-active members forming shield 14 would then be electrically tied together and to this single reset bus connecting and controlling the active members to ensure that the shield members are always at the same electrical potential as the adjacent active members 30. While the embodiment of FIG. 6 is illustrated as being reset in columns, the active pixel members 30 could be designed to be reset in rows if desired.

As shown, the rest of the outermost shield members 30 comprising shield 14, identified at "E", are all electrically and mechanically tied together, and are electrically isolated from those shown as A, B, C and D. These members are all typically tied to a +5 volt potential. Again, the reset buses shown in FIG. 6 are all electrically tied to the respective reset buses shown in FIG. 2.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A spatial light modulator, comprising.

a substrate;

an array of deflectable light reflecting members supported by a surface of said substrate; and a light shield supported by said substrate on a perimeter of said array of deflectable light reflecting members.

2. The spatial light modulator as specified in claim 1, wherein said light shield is comprised of a series of members connected together to form a flat surface.

3. The spatial light modulator as specified in claim 1, wherein said deflectable light reflecting members are supported by a first support structure, and said light shield is supported by a second support structure, said second support structure structurally similar to said first support structure.

4. The spatial light modulator as specified in claim 1, wherein said light shield is supported by a support structure comprising a continuous planar member extending over said substrate, said continuous planar member having a plurality of openings defined therethrough permitting any material positioned between said continuous planar member and said substrate to be undercut therefrom.

5. The spatial light modulator as specified in claim 1, wherein at least one of said deflectable light reflecting members is electrically connected to an adjacent portion of said light shield.

6. The spatial light modulator as specified in claim 1, said light shield formed by at least one rectangular reflecting region connected to an adjacent said rectangular reflecting region.

7. The spatial light modulator as specified in claim 1, wherein said light shield and said deflectable light reflecting members are supported by said substrate in the same plane.

8. The spatial light modulator as specified in claim 1, wherein said light shield surrounds said array of deflectable light reflecting members.

9. The spatial light modulator as specified in claim 1, said array of deflectable mirror elements and said light shield each formed by a coplanar array of rectangular surfaces, said rectangular surfaces in a region forming said array of deflectable mirror elements operable to deflect, and said rectangular surfaces in a region forming said light shield not operable to deflect.

10. A method of forming a micromirror device including an active mirror array and a perimeter light shield, comprising the steps of:

depositing a spacer material on a substrate;

depositing a metal layer over said spacer material;

patterning said metal layer to form an array of deflectable mirror elements and at least one light shield on a perimeter of said array; and undercutting said spacer material from beneath both said array and said at least one light shield.

11. The method as specified in claim 10, said step of depositing a spacer material comprising the step of depositing a photoresist.

12. The method as specified in claim 11, said undercutting step comprising removing said spacer material using a plasma etch process.

13. The method as specified in claim 10, said step of patterning said metal layer comprising the step of patterning said metal layer to form said array and said light shield surrounding said array.

14. The method as specified in claim 10, said step of patterning said metal layer comprising the step of patterning the metal layer to form an array of rectangular elements, some of said rectangular elements forming said array of deflectable mirror elements, and some of rectangular elements forming said light shield.

15. The method as specified in claim 10, said step of patterning said metal layer comprising the step of patterning the metal layer to form an array of rectangular elements, some of said rectangular elements forming said light shield being interconnected at the corners of said rectangular elements.

* * * * *